United States Patent
Bastide et al.

(10) Patent No.: US 10,904,347 B2
(45) Date of Patent: Jan. 26, 2021

(54) INDICATING IN AN ELECTRONIC COMMUNICATION SESSION A CONCENTRATION LEVEL SCORE OF A USER PARTICIPATING IN THE ELECTRONIC COMMUNICATION SESSION

(71) Applicant: INTERNATIONAL BUSINESS MACHINES CORPORATION, Armonk, NY (US)

(72) Inventors: Paul R. Bastide, Ashland, MA (US); Vishrawas Gopalakrishnan, Cambridge, MA (US); Piyush Madan, Boston, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/351,035

(22) Filed: Mar. 12, 2019

(65) Prior Publication Data
US 2020/0296176 A1   Sep. 17, 2020

(51) Int. Cl.
*H04L 29/08* (2006.01)
*H04L 29/06* (2006.01)

(52) U.S. Cl.
CPC .......... *H04L 67/22* (2013.01); *H04L 65/4053* (2013.01)

(58) Field of Classification Search
CPC ............................ H04L 67/22; H04L 65/4053
See application file for complete search history.

(56) References Cited

U.S. PATENT DOCUMENTS

| | | | |
|---|---|---|---|
| 6,894,714 B2 | 5/2005 | Gutta et al. | |
| 7,921,369 B2 | 4/2011 | Bill | |
| 2009/0113318 A1 | 4/2009 | Roseway et al. | |
| 2014/0207878 A1 | 7/2014 | Malkin et al. | |
| 2014/0222935 A1 | 8/2014 | Jhanji | |
| 2015/0154291 A1* | 6/2015 | Shepherd | H04L 65/403 707/748 |
| 2016/0073054 A1* | 3/2016 | Balasaygun | H04L 12/1813 348/14.08 |
| 2016/0241496 A1 | 8/2016 | Cunico et al. | |
| 2018/0089636 A1* | 3/2018 | Gatzke | G06Q 10/1095 |
| 2018/0211178 A1 | 7/2018 | Millius et al. | |
| 2019/0034706 A1* | 1/2019 | el Kaliouby | H04N 21/266 |

* cited by examiner

*Primary Examiner* — Chris Parry
*Assistant Examiner* — Steven C Nguyen
(74) *Attorney, Agent, or Firm* — Cuenot, Forsythe & Kim, LLC

(57) ABSTRACT

Communication session data pertaining to a first user can be received during an electronic communication session in which the first user and at least a second user participate. The communication session data can be analyzed. Based on the analysis, a concentration level score of the first user can be determined. A contextual indicator indicating the concentration level score of the first user can be generated. The contextual indicator can be communicated to a second client device used by the second user. Communicating the first contextual indicator to the second client device can initiate the second client device to present, in a user interface used by the second user for the communication session, a first user interface element indicating the concentration level score of the first user.

15 Claims, 5 Drawing Sheets

INDICATING IN AN ELECTRONIC COMMUNICATION SESSION A CONCENTRATION LEVEL SCORE OF A USER PARTICIPATING IN THE ELECTRONIC COMMUNICATION SESSION

BACKGROUND

The present invention relates to data processing systems, and more specifically, to electronic communication systems.

With the continued proliferation of Internet connected electronic devices, use of electronic communication continues to grow. Indeed, technological innovations developed in recent decades, such as network based collaboration systems, voice conferencing systems, video conferencing systems, etc., allow people to communicate and collaborate from disparate locations. For example, people located in different geographical regions may participate in an electronically hosted text-based communication session, voice conference, video conference or audio/video conference.

SUMMARY

A method includes receiving, from a first client device, communication session data pertaining to a first user during an electronic communication session in which the first user and at least a second user participate. The method also can include analyzing, using a processor, the communication session data and, based on the analyzing the communication session data, determining a concentration level score of the first user, the concentration level score indicating a level of concentration of the first user in the electronic communication session. The method also can include generating a first contextual indicator indicating the concentration level score of the first user. The method also can include communicating the first contextual indicator to a second client device used by the second user, communicating the first contextual indicator to the second client device initiating the second client device to present, in a user interface used by the second user for the communication session, a first user interface element indicating the concentration level score of the first user.

A system includes a processor programmed to initiate executable operations. The executable operations include receiving, from a first client device, communication session data pertaining to a first user during an electronic communication session in which the first user and at least a second user participate. The executable operations also can include analyzing the communication session data and, based on the analyzing the communication session data, determining a concentration level score of the first user, the concentration level score indicating a level of concentration of the first user in the electronic communication session. The executable operations also can include generating a first contextual indicator indicating the concentration level score of the first user. The executable operations also can include communicating the first contextual indicator to a second client device used by the second user, communicating the first contextual indicator to the second client device initiating the second client device to present, in a user interface used by the second user for the communication session, a first user interface element indicating the concentration level score of the first user.

A computer program product includes a computer readable storage medium having program code stored thereon. The program code is executable by a data processing system to initiate operations. The operations include receiving, from a first client device, communication session data pertaining to a first user during an electronic communication session in which the first user and at least a second user participate. The operations also can include analyzing the communication session data and, based on the analyzing the communication session data, determining a concentration level score of the first user, the concentration level score indicating a level of concentration of the first user in the electronic communication session. The operations also can include generating a first contextual indicator indicating the concentration level score of the first user. The operations also can include communicating the first contextual indicator to a second client device used by the second user, communicating the first contextual indicator to the second client device initiating the second client device to present, in a user interface used by the second user for the communication session, a first user interface element indicating the concentration level score of the first user.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
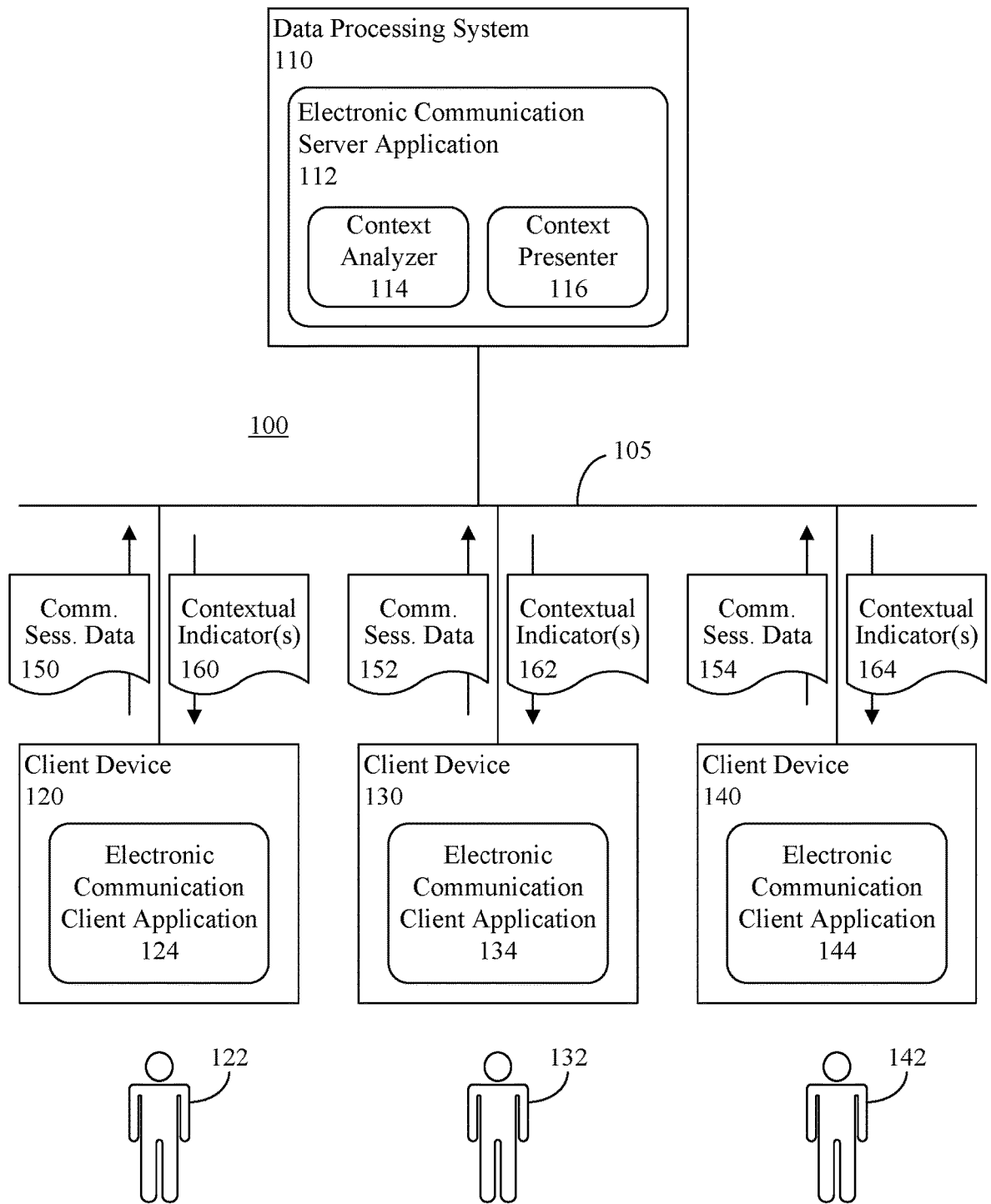
FIG. 1 is a block diagram illustrating an example of a computing environment.

This disclosure relates to data processing systems, and more specifically, to electronic communication systems. In accordance with the inventive arrangements disclosed herein, communication session data can be received from one or more client devices during an electronic communication session. The communication session data can be analyzed. Based on the analysis, various information about users of the client devices can be determined, for example their respective levels of concentration on the communication session, durations of time available to continue participating in the communication session, reasons affecting the concentration levels and/or available durations of time, etc. The concentration levels, available durations of time and reasons for one or more of the users can be presented to other users participating in the communication session. Accordingly, those other users can make better decisions about communicating in the communication session. For example, if a particular user is showing a low concentration level, other users can wait for the user to respond before contributing further communications in the communication session. If a particular user must leave the communication session at a particular time, the other users can be sure to initiate discussion of high priority subjects to provide adequate time for those subjects to be discussed prior to the user logging out of the communication session.

Several definitions that apply throughout this document now will be presented.

As defined herein, the term "electronic communication session," or more simply "communication session," means a communication session hosted by a data processing system in which a plurality of users participate using client devices communicatively linked to the data processing system via one or more communication networks.

As defined herein, the term "communication session data" means data generated by a client device during an electronic communication session in which a user of the client device is participating.

As defined herein, the term "concentration level score" means a score indicating a level of concentration of a user on a communication session in which the user is participating.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a computing environment 100. The computing environment 100 can include at least one data processing system 110, for example a server, and a plurality of client devices 120, 130, 140 used by users 122, 132, 142. The client devices 120, 130, 140 and the data processing system 110 can be communicatively linked via a communication network 105. The communication network 105 is the medium used to provide communications links between various devices and data processing systems connected together within the computing environment 100. The communication network 105 may include connections, such as wire, wireless communication links, or fiber optic cables. The communication network 105 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

The data processing system 110 can execute an electronic communication server application 112. Similarly, each client device 120, 130, 140 can execute a respective electronic communication client application 124, 134, 144. The electronic communication server application 112 can host electronic communication sessions in which the users 122, 132, 142 of two or more of the client devices 120, 130, 140 participate using respective electronic communication client applications 124, 134, 144. In an arrangement, the electronic communication client applications 124, 134, 144 can be application specific, configured for one or more types of electronic communications. For example, the electronic communication client applications 124, 134, 144 can be audio conference applications, video conferencing applications, etc. In another arrangement, the electronic communication client applications 124, 134, 144 can be web browsers that include teleconferencing and/or video conferencing functionality, for example using one or more plug-ins, which are known in the art.

Figure 2:
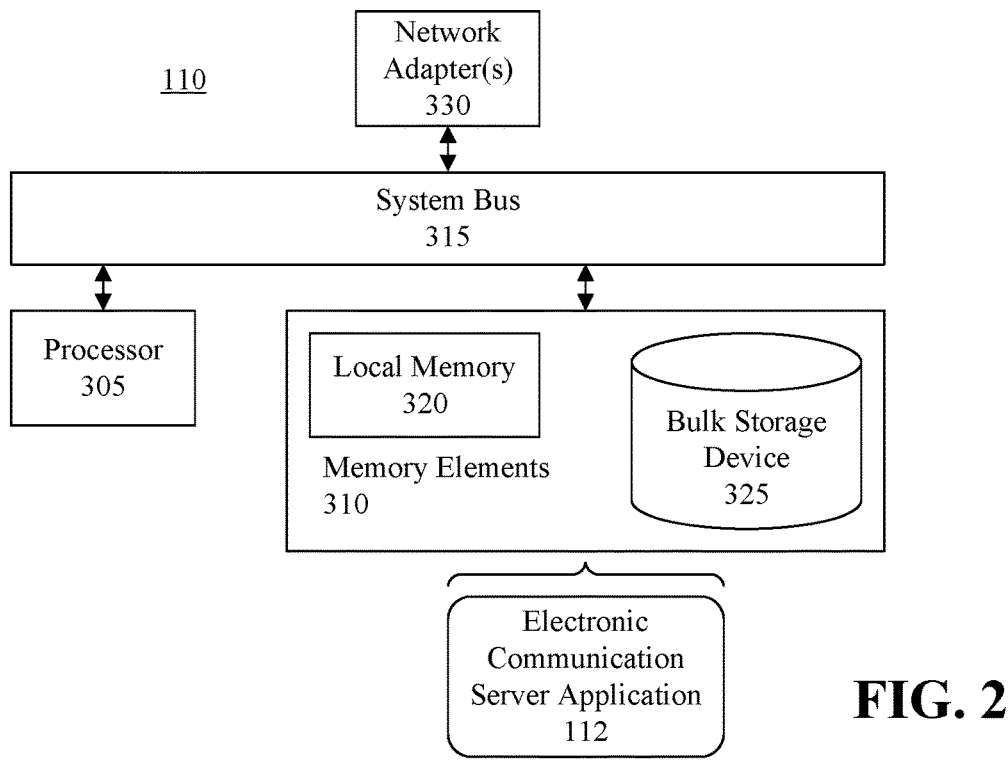
FIG. 2 is a block diagram illustrating example architecture for a data processing system.

FIG. 2 is a block diagram illustrating example architecture for the data processing system 110. The data processing system 110 can include at least one processor 205 (e.g., a central processing unit) coupled to memory elements 210 through a system bus 215 or other suitable circuitry. As such, the data processing system 110 can store program code within the memory elements 210. The processor 205 can execute the program code accessed from the memory elements 210 via the system bus 215. It should be appreciated that the data processing system 110 can be implemented in the form of any system including a processor and memory that is capable of performing the functions and/or operations described within this specification that are performed by the data processing system 110. For example, the data processing system 110 can be implemented as a server, a plurality of communicatively linked servers, and so on.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 225 during execution.

One or more network adapters 230 can be coupled to data processing system 110 to enable the data processing system 110 to become coupled to other systems, computer systems, remote printers, and/or remote storage devices through intervening private or public networks. Modems, cable modems, transceivers, and Ethernet cards are examples of different types of network adapters 230 that can be used with the data processing system 110.

As pictured in FIG. 2, the memory elements 410 can store the components of the data processing system 110 of FIG. 1, namely the electronic communication server application 112. Being implemented in the form of executable program code, the electronic communication server application 112 can be executed by the data processing system 110 and, as such, can be considered part of the data processing system 110. Moreover, the electronic communication server application 112 is a functional data structures that impart functionality when employed as part of the data processing system 110.

Figure 3:
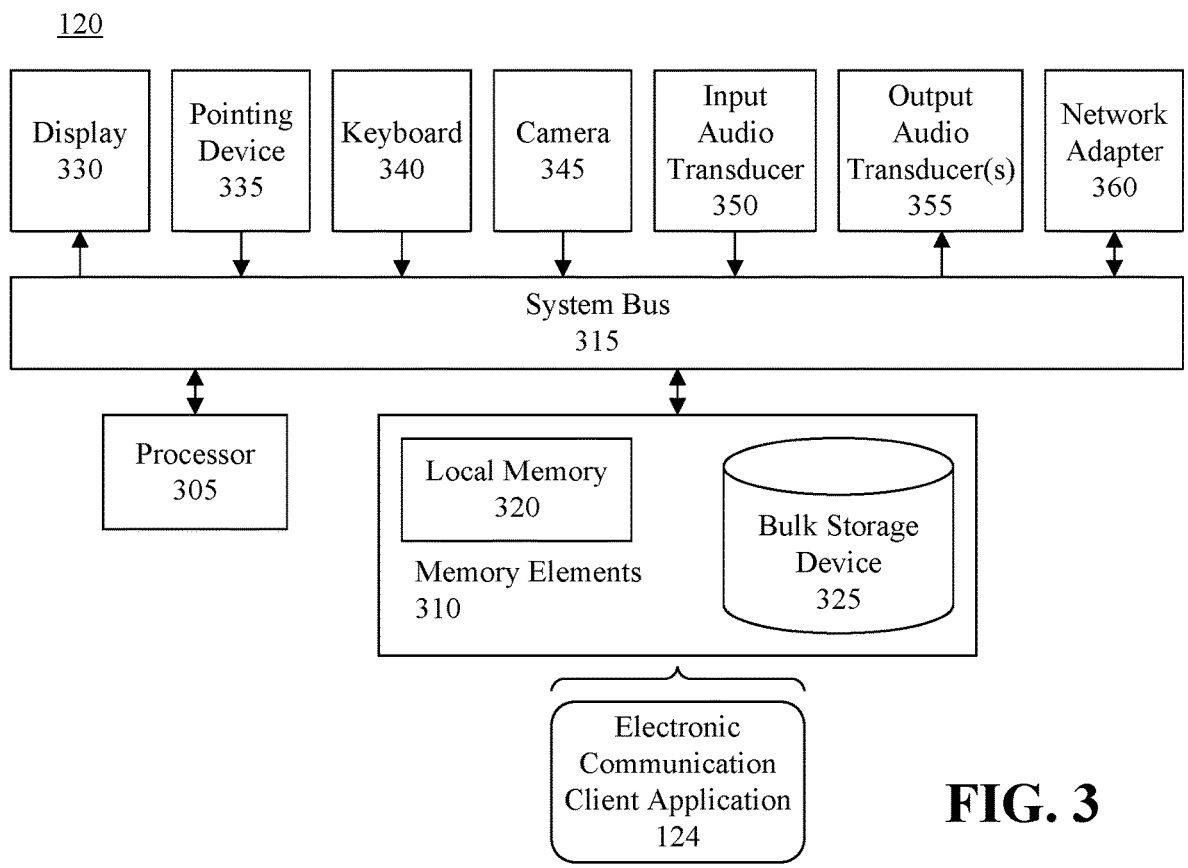
FIG. 3 is a block diagram illustrating example architecture for a client device.

FIG. 3 is a block diagram illustrating example architecture for the client device 120. The client devices 130, 140 can be configured in a similar manner. The client device 120 can include at least one processor 305 (e.g., a central processing unit) coupled to memory elements 310 through a system bus 315 or other suitable circuitry. As such, the client device 120 can store program code within the memory elements 310. The processor 305 can execute the program code accessed from the memory elements 310 via the system bus 315. It should be appreciated that the client device 120 can be implemented in the form of any system including a processor and memory that is capable of performing the functions and/or operations described within this specification that are performed by one or more of the client devices 120-124.

The memory elements 310 can include one or more physical memory devices such as, for example, local memory 320 and one or more bulk storage devices 325. The client device 120 also can include one or more cache memories (not shown) that provide temporary storage of at least some program code in order to reduce the number of times program code must be retrieved from the bulk storage device 325 during execution.

Input/output (I/O) devices such as a display 330, a pointing device 335, a keyboard 340 (e.g., a hardware keyboard and/or a virtual keyboard), a camera 345, an input audio transducer 350 (e.g., a microphone), and one or more output audio transducers 355 (e.g., speakers) can be coupled to the client device 120. The I/O devices can be coupled to the client device 120 either directly or through intervening I/O controllers. One or more network adapters 360 also can be coupled to client device 120 to enable the client device 120 to become coupled to other systems, computer systems, remote printers, and/or remote storage devices through intervening private or public networks. Modems, cable modems, transceivers, and Ethernet cards are examples of different types of network adapters 360 that can be used with the client device 120.

As pictured in FIG. 3, the memory elements 310 can store the components of the client device 120 of FIG. 1, namely the electronic communication client application 124. Being implemented in the form of executable program code, the electronic communication client application 124 can be executed by the client device 120 and, as such, can be considered part of the client device 120. Moreover, the electronic communication client application 124 is a functional data structures that impart functionality when employed as part of the client device 120.

Reference now is made to FIGS. 1 and 3. In the following description operation of the electronic communication client application 124 is described. The electronic communication client applications 134, 144 can be configured in a similar manner. During an electronic communication session hosted by the electronic communication server application 112 in which the users 122, 132, 142 are participating, the electronic communication client application 124 can receive data generated by the camera 345 for images and/or video captured by the camera 345 and receive audio data for audio signals detected by the input audio transducer 350. For example, the processor 305 can store the image data generated by the camera 345 to the memory elements 310 and the electronic communication client application 124 can access the image data from the memory elements 310. Further, analog audio signals detected by the input audio transducer 350 can be communicated from the input audio transducer 350 to an audio controller (e.g., an audio analog to digital converter), and the audio controller can convert the analog audio signals to digital audio data (hereinafter "audio data"). The processor 305 can store the audio data to the memory elements 310 and the electronic communication client application 124 can access the audio data from the memory elements 310.

The electronic communication client application 124 also can receive other types of information pertaining to the user 122. Such other information can include, for example, a geographic location of the client device 120, and thus the user 122, and a time of day where the client device 120, and thus the user 122, is located, text-based communications sent by, received by or read by the user 122, etc. The information pertaining to the user 122 also can include entries in an electronic calendar used by the user, etc. The electronic communication client application 124 can acquire the location and time information from another application or operating system executing on the client device 120 using techniques known in the art.

The electronic communication client application 124 can communicate to the electronic communication server application 112 communication session data 150 including the text, image data, audio data and other information. Similarly, the electronic communication client applications 134, 144 can communicate to the electronic communication server application 112 respective communication session data 152, 154 including the text, image data, audio data and other information. It should be noted that the communication session data 150, 152, 154 can include the image data, regardless of whether the electronic communication session is a text-based communication session (e.g., text-based collaboration session), an audio conference (e.g., audio only) or a video conference (e.g., video only or audio and video). In an arrangement in which the electronic communication session is text-based or an audio conference, the electronic communication client applications 124, 134, 144 can communicate in the communication session data 150, 152, 154 the image data at a resolution below a threshold value and/or communicate a portion of frames contained in the image data. By way of example, the communication session data 150, 152, 154 can include every fifth, every tenth, etc. frame of the image data at a resolution at or below 720 p, 480 p, etc. Accordingly, the network bandwidth utilized to communicate the communication session data 150, 152, 154 can be reduced in comparison to communicating each of the image data frames at high resolution.

The electronic communication server application 112 can receive the communication session data 150, 152, 154 from the respective client devices 120, 130, 140 and share the text, audio and/or video in the electronic communication session. In a case in which the electronic communication session is a text-based communication session, the electronic communication server application 112 can communicate the text contained in the communication session data 150 to the electronic communication client applications 134, 144, communicate the text contained in the communication session data 152 to the electronic communication client applications 124, 144, and communicate the text contained in the communication session data 154 to the electronic communication client applications 124, 134. In a case in which the electronic communication session is an audio conference, the electronic communication server application 112 can communicate the audio data contained in the communication session data 150 to the electronic communication client applications 134, 144, communicate the audio data contained in the communication session data 152 to the electronic communication client applications 124, 144, and communicate the audio data contained in the communication session data 154 to the electronic communication client applications 124, 134. In a case in which the electronic communication session is a video conference without audio, the electronic communication server application 112 can communicate the image data contained in the communication session data 150 to the electronic communication client applications 134, 144, communicate the image data contained in the communication session data 152 to the electronic communication client applications 124, 144, and communicate the image data contained in the communication session data 154 to the electronic communication client applications 124, 134. In a case in which the electronic communication session is a video conference with audio (e.g., an audio/video conference), the electronic communication server application 112 can communicate the image data and audio data contained in the communication session data 150 to the electronic communication client applications 134, 144, communicate the image data and audio data contained in the communication session data 152 to the electronic communication client applications 124, 144, and communicate the image data and audio data contained in the communication session data 154 to the electronic communication client applications 124, 134. The electronic communication client applications 124, 134, 144 can present the received data during the electronic communication session via respective output audio transducers and/or displays using techniques known in the art.

In addition to sharing the text, audio and/or video data, the electronic communication server application 112 also can generate and share contextual information pertaining to one or more of the users 122, 132, 142. In this regard, the electronic communication server application 112 can include a context analyzer 114 configured to process the communication session data 150, 152, 154 received from the client devices 120, 130, 140, identify contextual information contained in the communication session data 150, 152, 154 and, based on the contextual information, determine information about the users 122, 132, 142 pertaining to their participation in the electronic communication session. Further, the electronic communication server application 112 can include a context presenter 116 configured present to the users 122, 132, 142 information based on results of the analysis performed by the context analyzer 114.

In illustration, based on analyzing the communication session data 150, 152, 154, the context analyzer 114 can determine levels of concentration of the users 122, 132, 142 in the electronic communication session, levels of distraction distracting the users 122, 132, 142 from the electronic communication session, determine when the users 122, 132, 142 should, or need to, withdraw from or terminate the electronic communication session, etc. The context presenter 116 can communicate to one or more of the electronic communication client applications 124, 134, 144 contextual indicators 160, 162, 164 indicating the determined information. The electronic communication client applications 124, 134, 144 can present the contextual indicators 160, 162, 164 to the users 122, 132, 142, as appropriate, via displays and/or output audio transducers of the respective client devices 120, 130, 140. The context analyzer 114 can continually or periodically monitor (e.g., every 5 seconds, every 10 seconds, every 30 seconds, every minute, etc.) the levels of concentration of the users 122, 132, 142 and update the contextual indicators 160, 162, 164 during the communication session. In one non-limiting arrangement, the context analyzer 114 can update the contextual indicators 160, 162, 164 in real time, and thus the electronic communication client applications 124, 134, 144 can present the updates to one or more of the users 122, 132, 142 in real time.

By way of example, based on analyzing image data and/or video data contained in the communication session data 154, the context analyzer 114 can determine a concentration level of the user 142 on the communication session. For instance, by analyzing the image data, the context analyzer 114 can identify the user 142 in images contained in the image data and determine whether the user 142. The context analyzer 114 can identify the user 142 using facial recognition, which is known in the art, or assume that a user contained in the images is the user 142 since the communication session data 154 is being received from the electronic communication client application 144 to which the user is logged in. If more than one user is depicted in the images, the context analyzer 114 can assume the user closest to the camera of the client device 140 is the user 142. During the analysis, the context analyzer 114 can determine whether the user's gaze is focused on a display of the client device 140, determine how often the user gazes away from the display, determine lengths of time the user gazes away from the display, etc. Further, during the analysis the context analyzer 114 can determine whether one or more other users are depicted in the images, determine whether the user turns his/her gaze to the other user(s), determine how long the gaze of the user 142 is turned toward the other user(s), etc.

By analyzing the audio data contained in the communication session data 154, the context analyzer 114 can identify the voice of the user 142 contained in the audio data, for example by comparing the audio data to a voice print of the user 142 using voice recognition, which is known in the art. If the context analyzer 114 is not able to identify voice of the user 142 in the audio data, the context analyzer 114 can assume that the loudest voice contained in the audio data is the voice of the user 142. During the analysis, the context analyzer 114 can determine whether the user is speaking to other people not involved in the communication session, for example using speech recognition, which is known in the art. During the analysis, the context analyzer 114 also can determine a level of background noise in the environment in which the user 142 is physically located.

Based on the analysis of the image data and/or video data, the context analyzer 114 can assign a score (concentration level score) to the concentration level of the user 142 on the communication session. For example, the score can range between a value of 0 and 10, with 0 representing no concentration and 10 representing complete concentration. In illustration, if the user 142 gazes intently at the display, only provides spoken utterances directed to the communication session, and there is little to no background noise, the context analyzer 114 can assign a score of 10 to the concentration level of the user 142 on the communication session. If, however, the user 142 frequently gazes away from the display, provides spoken utterances directed to people not involved in the communication session, and/or there is a high level of background noise, the context analyzer 114 can assign a lower score to the concentration level of the user 142 on the communication session. For instance, the context analyzer 114 can determine a score adjustment value based on how frequently and/or how long the user 142 gazes away from the display, determine a score adjustment value based on how frequently and/or how long the user 142 interacts with other people not participating in the communication session, and/or determine a score adjustment value based a level of background noise in the environment in which the user 142 is physically located. The context analyzer 114 can deduct the score adjustment value(s) from the value 10 to determine the score for the concentration level of the user 142 on the communication session. If the determined score for the concentration level is less than 0, the context analyzer 114 can set the score to 0.

In an arrangement, the context analyzer 114 can access a data table that specifies score adjustment base values for numbers of times a user gazes away from a display within a particular period of time (e.g., 10 seconds, 20 seconds, 30 seconds, 60 seconds, etc.), and a data table that specifies a score adjustment multiplier for the score adjustment base values based on how an average period of time the user gazes away each time the user gazes away from the display. The context analyzer 114 can determine the number of times the user gazes away over the particular period of time and select from the data table the corresponding score adjustment base value. Further, the context analyzer 114 can determine average period of time the user gazes away each time the user gazes away and select from the data table the corresponding score adjustment multiplier. The context analyzer 114 can multiply the selected score adjustment base value by the score adjustment multiplier to derive a score adjustment value based on the user's gazes.

In an arrangement, a data table can specify score adjustment base values for numbers of times a user audibly interacts with one or more other people not involved in the communication session within a particular period of time (e.g., 10 seconds, 20 seconds, 30 seconds, 60 seconds, etc.), and a data table can specify a score adjustment multiplier for the score adjustment base values based on how an average period of time the user interacts with one or more other people not involved in the communication session each time the user performs such an interaction. The context analyzer 114 can determine the number of times the user interacts with one or more other people not involved in the communication session over the particular period of time and select from the data table the corresponding score adjustment base value. Further, the context analyzer 114 can determine average period of time the user interacts with one or more other people not involved in the communication session and select from the data table the corresponding score adjustment multiplier. The context analyzer 114 can multiply the selected score adjustment base value by the score adjustment multiplier to derive a score adjustment value based on the user's conversations with the other people.

In an arrangement, a data table can specify score adjustment values for audible levels of detected background noise. The context analyzer 114 can detect the audible level of background noise in the audio data and select from the data table a score adjustment value for the detected level of background noise.

In an arrangement, a data table can specify score adjustment values for a user's apparent level of understanding in the communication session. For example, the context analyzer 114 can implement facial and/or gesture recognition, which is known in the art, to determine whether the user exhibits facial gestures or other gestures indicative of a level of understanding. If gestures of the user indicate a high level of understanding, the context analyzer 114 can select a corresponding score adjustment value (e.g., 0 or 1) from a data table. If the gestures of the user indicate a low level of understanding and/or confusion, the context analyzer 114 can select a corresponding score adjustment value (e.g., 4 or 5) from the data table.

In an arrangement, one or more data tables can specify score adjustment values based on a user's calendar. Users sometimes are able to provide higher levels of concentration when the users are not very busy but may provide lower levels of concentration if they have busy schedules. The context analyzer 114 can access a user's calendar, determine a number of calendar entries for the present day, and determine a length of each of the day's calendar entries. The context analyzer 114 can select from a data table a score adjustment base value corresponding to the number of calendar entries for the present day and select from a data table a score adjustment multiplier for the score adjustment base value based on how an average period of time specified for each calendar entry. The context analyzer 114 can multiply the selected score adjustment base value by the score adjustment multiplier to derive a score adjustment value based on the user's calendar.

In an arrangement, the context analyzer 114 can derive a score adjustment value based on the user's consumption of food and/or beverages. In illustration, if a user is in a geographic region where it is a custom to fast during the present day, the context analyzer 114 can assign a score adjustment value based on this circumstance. If the image data depicts the user eating during the communication session, the context analyzer 114 can assign a score adjustment value based on this circumstance. If the image data depicts the user drinking one or more cups of coffee prior to or during the communication session, the context analyzer 114 can assign a score adjustment value based on this circumstance.

User's sometimes have lower concentration levels on holidays. In an arrangement, the context analyzer 114 can derive a score adjustment value based on whether it is a holiday in a geographic region where the user is located. If it is a holiday in that geographic region, the context analyzer 114 can assign a score adjustment value based on this circumstance.

User's sometimes have lower concentration levels as the present time approaches a time in which the user typically leaves the office to head home or go somewhere else. In an arrangement, the context analyzer 114 can derive a score adjustment value based the duration of time between the present time and the time the user typically leaves the office. Such time can be set in user preferences of the user's electronic communication client application 124, 134, 144 or a default value (e.g., 5:00 PM) can be set in the electronic communication server application 112. The context analyzer 114 can assign a score adjustment value based on the duration of time remaining before it is anticipated that the user will be leaving, and thus the user desiring to log out from the communication session.

Local weather conditions sometimes impact a user's level of concentration and/or impact when a user may want to leave. For example, if it is raining at the geographic location where the user is located, the user may want to leave early to avoid traffic congestion, and thus log out from the communication session early. Further, if there is a severe storm (e.g., a typhoon, a hurricane, etc.) heading toward a geographic region where a user is located, the user likely will be concerned about the storm and thus have a lower level of concentration on the communication session. In an arranging, the context analyzer 114 can select a score adjustment value based a weather condition at, or heading toward, the geographic location/region where the user is located. A data table can specify score adjustment values for different types of weather events and their severity. The context analyzer 114 can access a weather information service (e.g., via the Internet) to determine local weather conditions where the user is locates and/or moving weather events heading toward the user's geographic region. Based on the accessed information, the context analyzer can select a corresponding score adjustment value from the data table.

In an arrangement, via user preferences in an electronic communication client application 124, 134, 144, the users 122, 132, 142 can specify whether the user authorizes sentiment analyzes to be performed as well as specify the type of data/data sources to be used for the sentiment analyses. The context analyzer 114 also can perform one or more sentiment analyses, which are known in the art, to determine score adjustment values for the concentration of a user. For example, if authorized by the user, the context analyzer 114 can access electronic messages (e.g., e-mails, text messages, instant messages, posts to social collaboration forums, posts to social networking sites, etc.) sent by and/or read by the user on the present day and determine perform a sentiment analysis on those electronic messages. Based on the sentiment analysis, the context analyzer 114 can determine a sentiment of the user. The context analyzer 114 can access a data table that correlates sentiments to score adjustment values and select a score adjustment value corresponding to the determined sentiment of the user. Further, the context analyzer 114 can perform speech recognition on spoken utterances of the user and/or spoken utterances of other people contained in the audio data and generate corresponding text. The context analyzer 114 can perform sentiment analysis on the text to determine a sentiment of the spoken utterances. The context analyzer 114 can access a data table that correlates sentiments to score adjustment values and select a score adjustment value corresponding to the determined sentiment(s) of the detected spoken utterances.

Physical activity and computer issues also can impact a user's level of concentration. In an arrangement, the context analyzer 114 can derive score adjustment values based on other information pertaining to users. For example, assume a user 122, 132, 134 has authorized his/her electronic communication client application 124 to access data from his/her fitness tracking device and/or computer system and include corresponding data in the communication session data 150, 152, 154. The context analyzer 114 can analyze determine score adjustment values based on such data. For example, if data from a user's fitness tracking device indicates that the user has been very physically active on the present day, the context analyzer 114 can select a low score adjustment value (e.g., 0) for the user's physical activity. If the user has been moderately physically active, the context analyzer 114 can select a medium score adjustment value (e.g., 1) for the user's physical activity. If a user has not been physically active on the present day, the context analyzer 114 can select a higher score adjustment value (e.g., 2 or 3) for the user's physical activity. If a user is not experiencing computer problems, the context analyzer 114 can select a low score adjustment value (e.g., 0) for the user's computer interactions. If, however, the user is experiencing computer problems, such as a slow running computer and/or network connectivity problem, the context analyzer 114 can select a higher score adjustment value (e.g., 3 or 4) for the user's computer interactions.

The context analyzer 114 can determine the level of concentration score for each user 122, 132, 142 by subtracting one or more of the above described score adjustment values determined for the respective user from a predefined value, such as 10. As noted, if the result of the subtraction results in a value less than 1, the context analyzer 114 can set the score for the level of concentration to 0. The contextual indicators 160, 162, 164 can indicate the concentration level scores. For example, the contextual indicator 160 can indicate the concentration level scores assigned to the users 132, 142 and, optionally, the concentration level score assigned to the user 122. Similarly, the contextual indicator 162 can indicate the concentration level scores assigned to the users 122, 142 and, optionally, the concentration level score assigned to the user 132. Further, the contextual indicator 164 can indicate the concentration level scores assigned to the users 122, 132 and, optionally, the concentration level score assigned to the user 142.

If a concentration level score for one or more of the users 122, 132, 142 is below a threshold level (e.g., below 7), one or more of the contextual indicators 160, 162, 164 can indicate reasons for the concentration level score. For instance, the context analyzer 114 can communicate to the context presenter 116 information indicating one or more circumstances that result in score adjustment values that are above a threshold level (e.g., higher than 2). Such information can indicate, for example, the user is distracted by other people, there is high background noise, a weather condition at the user's geographic location, a weather condition approaching the user's geographic location, a holiday in a geographic region where the user is located, etc.

In a case in which it is anticipated that one or more of the users 122, 132, 142 will desire to log out of the communication session at a certain time, the contextual indicators 160, 162, 164 can indicate a duration of time remaining between the present time and the time anticipated that one or more of the users 122, 132, 142 will desire to log out of the communication session. In an arrangement, the contextual indicators 160, 162, 164 further can indicate reasons for which one or more of the users 122, 132, 142 will desire to log out of the communication session after the duration of time has passed, for example holiday information, weather information, etc. pertaining to one or more of the users 122, 132, 142.

As noted, the electronic communication client applications 124, 134, 144 can present information contained in the respective contextual indicators 160, 162, 164 via the respective client devices 120, 130, 140, for example on respective displays and/or via audible notifications presented via respective output audio transducers.

In an aspect of the present arrangements, the processes described herein as being performed by the electronic communication server application 112 can, for each user 122, 132, 142, be performed by the respective electronic communication client applications 124, 134, 144. In illustration, the electronic communication client application 124 can generate the contextual indicators pertaining to the user 122 and communicate those contextual indicators to the electronic communication client applications 134, 144. Similarly, the electronic communication client application 134 can generate the contextual indicators pertaining to the user 132 and communicate those contextual indicators to the electronic communication client applications 124, 144. Further, the electronic communication client application 144 can generate the contextual indicators pertaining to the user 142 and communicate those contextual indicators to the electronic communication client applications 124, 134.

Regardless of whether the contextual indicators are generated by the electronic communication server application 112 or the electronic communication client applications 124, 134, 144, responsive to receiving the contextual indicators, the electronic communication client applications 124, 134, 144 can present, in user interfaces used by the respective users 122, 132, 142 to participate in the communication session, user interface elements indicating the information conveyed by the contextual indicators.

Figure 4:
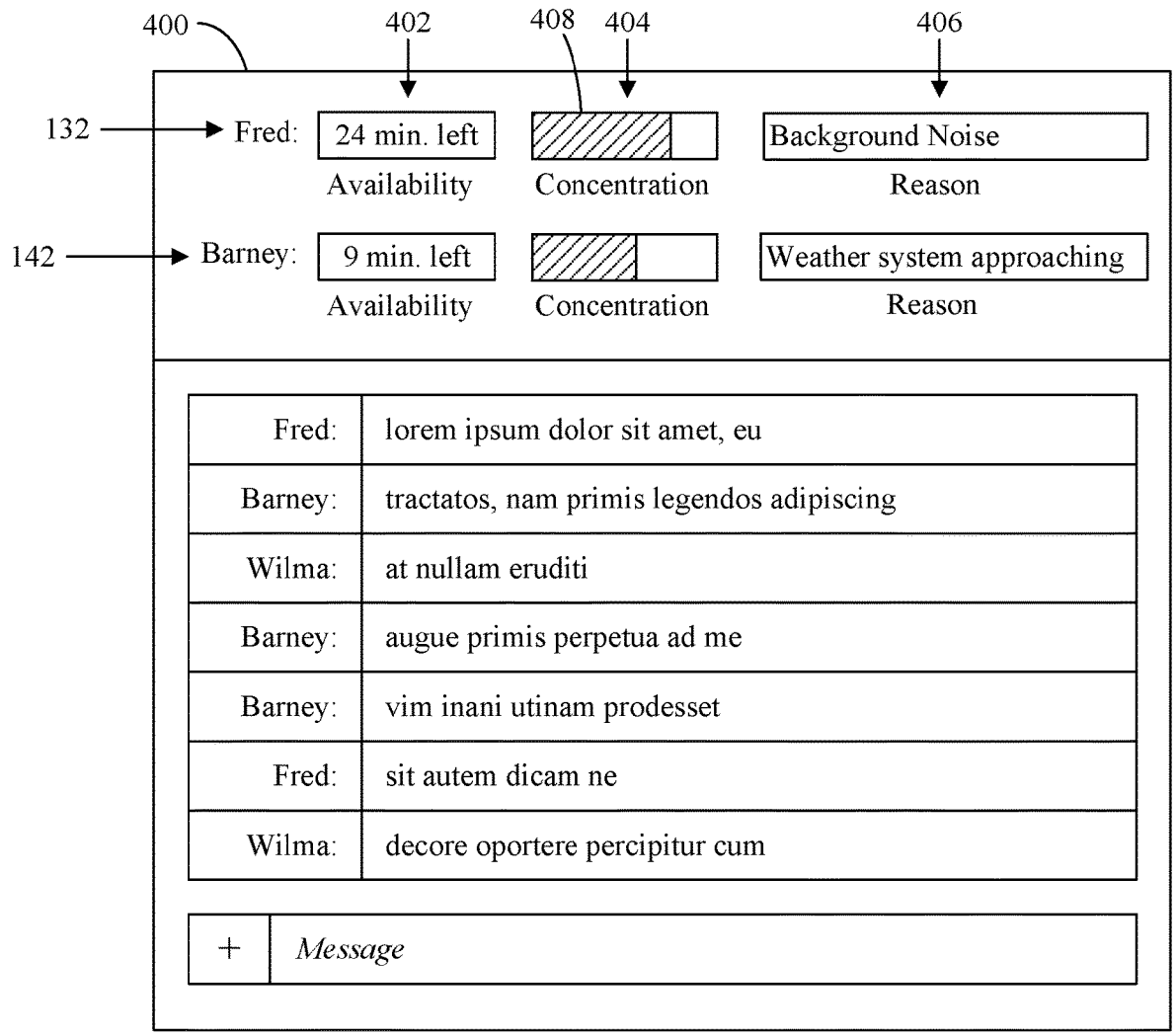
FIG. 4 depicts an example user interface presented for an electronic communication session.

FIG. 4 depicts an example user interface (UI) 400 presented for an electronic communication session on a display. In this example, the UI 400 is for a text-based electronic communication session, though those of ordinary skill in the art will appreciate that the visual indicators described can be presented in UIs for audio communication sessions, video communication sessions and/or audio/video communication sessions. Further, in lieu of, or in addition to, the visual indicators, the UI 400 can present audible notifications via one or more output audio transducers.

In this example, the UI 400 is presented by the electronic communication client application 124 to the user 122 (e.g., Wilma) via the display 330 of the client device 120, and the user 122 is communicating with the user 132 (e.g., Fred) and the user 142 (e.g., Barney). In the UI 400 the electronic communication client application 124 can present, for one or more of the users 132, 142, UI elements 402, 404, 406 representing the contextual indicators 160 received from the electronic communication server application 112. The presentation of the UI elements 402, 404, 406 can be specified by the context presenter 116 of the electronic communication server application 112, for example based on user preferences set by the users 122, 132, 142. The information presented in the UI elements 402, 404, 406 can be determined by the context analyzer 114, as previously described, and communicated to the electronic communication client application 124 as the contextual indicators 160.

The UI element(s) 402 can indicate the duration of time left for which the respective users 132, 142 are available to continue participating in the communication session, as indicated by the contextual indicators 160. The UI element(s) 404 can indicate the concentration level of the respective users 132, 142 in the communication session, as indicated by the contextual indicators 160. The UI elements 406 can indicate the reason(s) for the availability and/or concentration level(s) indicated in the UI elements 402, 404, as indicated by the contextual indicators 160. The reason(s) can be, for example, circumstances contributing to the concentration level score(s) and/or the duration of time(s) left for which the respective users 132, 142 are available to continue participating in the communication session.

In one arrangement, the UI element 404 can be presented as a field including a bar 408 having a length that indicates the concentration level, as depicted in FIG. 4. In another arrangement, the UI element 404 can be depicted as a particular color that indicates the concentration level. For example, the color green can correspond to a high level of concentration (e.g., a concentration level score between 7 and 10), the color yellow for a moderate level of concentration (e.g., a concentration level score between 4 and 7), and the color red for a low level of concentration (e.g., a concentration level score between 0 and 4). Further, the UI element 404 can be depicted with color gradients indicating the concentration level. In another arrangement, the UI element 404 can present text (e.g., a number) indicating the actual score of the corresponding concentration level.

As noted, the contextual indicators 160 can be updated by the context analyzer 114 in real time based on additional communication session data 152, 154 received from the electronic communication client applications 134, 144. The context presenter 116 can communicate the updated contextual indicators 160 to the electronic communication client application 124. In response, the electronic communication client application 124 can update UI elements 402, 404, 406, in real time, in accordance with the updated contextual indicators 160. For example, of the concentration level of the user 132 changes during the communication session, the UI element 404 can be updated to reflect the current concentration level of the user 132. Similarly, if the additional communication session data 152, 154 indicates that the user 132 will have additional time to participate in the communication session (e.g., a scheduled meeting was postponed, a weather condition subsided, etc.), the UI element 402 can be updated to reflect the additional time for which the user 132 is available to continue participating in the communication session. Further, the UI element 406 can be updated with one or more reasons contributing to the changes in concentration level and/or additional time.

Figure 5:
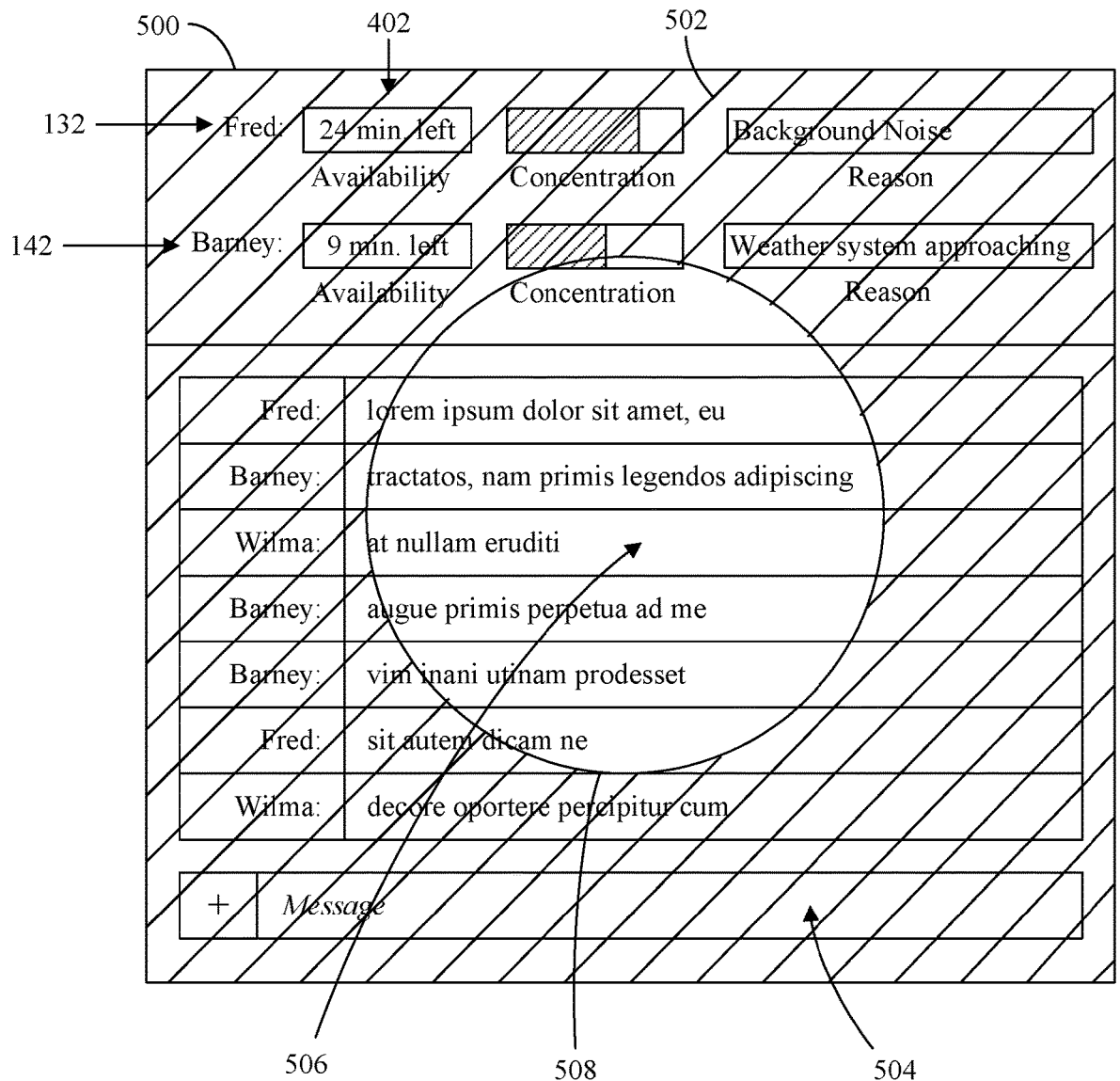
FIG. 5 depicts another example user interface presented for an electronic communication session.

FIG. 5 depicts another example user interface (UI) 500 presented for an electronic communication session on a display. In this example, the UI 500 is for a text-based electronic communication session, though those of ordinary skill in the art will appreciate that the visual indicators described can be presented in UIs for audio communication sessions, video communication sessions and/or audio/video communication sessions. Further, in lieu of, or in addition to, the visual indicators, the UI 500 can present audible notifications via one or more output audio transducers.

In the UI 400 the electronic communication client application 124 can present, for at least one of the users 132, 142, an indicator 502 indicating the duration of time left for which the user 132, 142 is available to continue participating in the communication session. For example, as shown by the UI elements 402, the user 142 has the least amount of available time left to continue participating. Accordingly, the indicator 502 can be based on that mount of time.

The indicator 502 can be presented over the UI 500. A portion 504 of the indicator 502 represented by hatched lines can be see through, but shaded with a color (e.g., gray), and thus partially opaque, meaning that the user 122 is able to see other elements of the UI 500 through that portion 504 of the indicator, but portions of the UI 500 where the portion 504 of the indicator 502 is positioned are presented with a colored tint. A portion 506 of the indicator 502, for example within a circle 508 bounded by the portion 504 (e.g., completely circumferentially bounded), can be clear, meaning that the portions of the UI 500 where the portion 506 is located are presented without the colored tint. In other words, the portions of the UI 500 where the portion 506 is located are presented in the original colors. The portion 506 of the indicator 502 can decrease in size as time progresses during the communication session at a rate in which the portion 506 will be eliminated when at least one of the users (e.g., the user 142) has no more time available to participate in the communication session. In this regard, the portion 506 can be presented to replicate a view through a lens which is closing over time. Even though the indicator 502 is presented over the UI 500, the user 122 can read text of the communication session through the portions 504, 506 of the indicator 502 and create new messages for the communication session.

In an arrangement in which the communication session is an audio conference, video conference and/or audio/video conference, the user 122 will be able to see through the indicator 502 visible content presented by the UI 500, though content presented where the portion 504 of the indicator 502 is presented will be presented with a colored tint.

In an arrangement, the indicator 502 also can be presented in the UIs presented to the users 132, 142 via their respective electronic communication client applications 134, 144. The indicator 502 can serve to indicate to the user 122 and, optionally, the user 132 and/or user 142, the amount of time remailing available for the communication session. This can prompt the user(s) to be efficient with their communications and convey any information they wish to convey in the available time.

Figure 6:
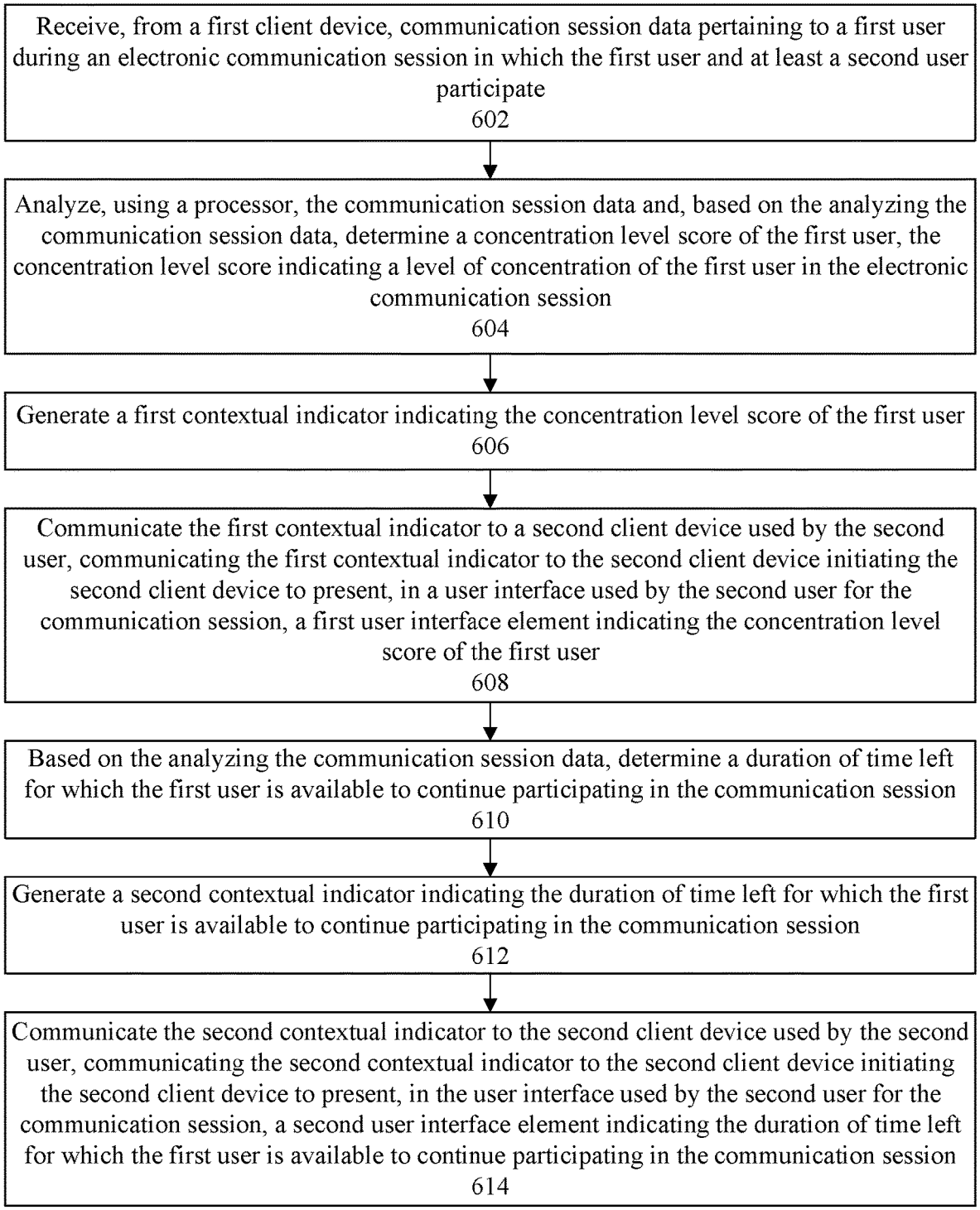
FIG. 6 is a flowchart illustrating an example of a method of indicating information pertaining to users participating in an electronic communication session.

FIG. 6 is a flowchart illustrating an example of a method 600 of indicating information pertaining to users participating in an electronic communication session. The following description will refer to the method 600 being performed by data processing system 110 of FIG. 1, but it will be understood by those skilled in the art that the method 600 can be performed by one or more of the client devices 120, 130, 140 of FIG. 1.

At step 602 the data processing system 110 can receive, from a first client device, communication session data pertaining to a first user during an electronic communication session in which the first user and at least a second user participate. At step 604 the data processing system 110 can analyze, using a processor, the communication session data and, based on the analyzing the communication session data, determine a concentration level score of the first user, the concentration level score indicating a level of concentration of the first user in the electronic communication session. At step 606 the data processing system 110 can generate a first contextual indicator indicating the concentration level score of the first user. At step 608 the data processing system 110 can communicate the first contextual indicator to a second client device used by the second user, communicating the first contextual indicator to the second client device initiating the second client device to present, in a user interface used by the second user for the communication session, a first user interface element indicating the concentration level score of the first user.

At step 610 the data processing system 110 can, based on the analyzing the communication session data, determine a duration of time left for which the first user is available to continue participating in the communication session. At step 612 the data processing system 110 can generate a second contextual indicator indicating the duration of time left for which the first user is available to continue participating in the communication session. At step 614 the data processing system 110 can communicate the second contextual indicator to the second client device used by the second user, communicating the second contextual indicator to the second client device initiating the second client device to present, in the user interface used by the second user for the communication session, a second user interface element indicating the duration of time left for which the first user is available to continue participating in the communication session.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, from a first client device, communication session data pertaining to a first user during an electronic communication session in which the first user and at least a second user participate;
analyzing, using a processor, the communication session data and, based on the analyzing the communication session data, determining a concentration level score of the first user, the concentration level score indicating a level of concentration of the first user in the electronic communication session;
generating a first contextual indicator indicating the concentration level score of the first user;
communicating the first contextual indicator to a second client device used by the second user, communicating the first contextual indicator to the second client device initiating the second client device to present, in a user interface used by the second user for the communication session, a first user interface element indicating the concentration level score of the first user;
based on the analyzing the communication session data, determining a duration of time left for which the first user is available to continue participating in the communication session;
generating a second contextual indicator indicating the duration of time left for which the first user is available to continue participating in the communication session; and
communicating the second contextual indicator to the second client device used by the second user, communicating the second contextual indicator to the second client device initiating the second client device to present, in the user interface used by the second user for the communication session, a second user interface element indicating the duration of time left for which the first user is available to continue participating in the communication session, wherein the second user interface element indicating the duration of time left for which the first user is available to continue participating in the communication session comprises:
a first portion that is shaded with a color but through which the second user is able to see other elements of the user interface over which the first portion of the second user interface element is positioned; and
a second portion bounded by the first portion, the second portion being clear and through which the second user is able to see the second portion to see other elements of the user interface over which the second portion of the second user interface element is positioned, wherein the second portion decreases in size as time progresses during the communication session.

2. The method of claim 1, further comprising:
updating, in real time, the first contextual indicator indicating the concentration level score of the first user based on further communication session data pertaining to the first user received during the electronic communication session; and
communicating the updated first contextual indicator to the second client device used by the second user, communicating the updated first contextual indicator to the second client device initiating the second client device to update the first user interface element indicating the concentration level score of the first user.

3. The method of claim 1, further comprising:
generating a third contextual indicator indicating at least one circumstance contributing to the concentration level score of the first user; and
communicating the third contextual indicator to the second client device used by the second user, communicating the third contextual indicator to the second client device initiating the second client device to present, in the user interface used by the second user for the communication session, a third user interface element indicating the at least one circumstance.

4. The method of claim 1, further comprising:
generating a third contextual indicator indicating at least one circumstance contributing to the determining the duration of time left for which the first user is available to continue participating in the communication session; and
communicating the third contextual indicator to the second client device used by the second user, communicating the third contextual indicator to the second client device initiating the second client device to present, in the user interface used by the second user for the communication session, a third user interface element indicating the at least one circumstance.

5. The method of claim 1, further comprising:
updating, in real time, the second contextual indicator indicating the duration of time left for which the first user is available to continue participating in the communication session based on further communication session data pertaining to the first user received during the electronic communication session; and
communicating the updated second contextual indicator to the second client device used by the second user, communicating the updated second contextual indicator to the second client device initiating the second client device to update the second user interface element indicating the duration of time left for which the first user is available to continue participating in the communication session.

6. A system, comprising:
a processor programmed to initiate executable operations comprising:
receiving, from a first client device, communication session data pertaining to a first user during an electronic communication session in which the first user and at least a second user participate;
analyzing the communication session data and, based on the analyzing the communication session data, determining a concentration level score of the first user, the concentration level score indicating a level of concentration of the first user in the electronic communication session;
generating a first contextual indicator indicating the concentration level score of the first user;
communicating the first contextual indicator to a second client device used by the second user, communicating the first contextual indicator to the second client device initiating the second client device to present, in a user interface used by the second user for the communication session, a first user interface element indicating the concentration level score of the first user;
based on the analyzing the communication session data, determining a duration of time left for which the first user is available to continue participating in the communication session;

generating a second contextual indicator indicating the duration of time left for which the first user is available to continue participating in the communication session; and communicating the second contextual indicator to the second client device used by the second user, communicating the second contextual indicator to the second client device initiating the second client device to present, in the user interface used by the second user for the communication session, a second user interface element indicating the duration of time left for which the first user is available to continue participating in the communication session, wherein the second user interface element indicating the duration of time left for which the first user is available to continue participating in the communication session comprises:
- a first portion that is shaded with a color but through which the second user is able to see other elements of the user interface over which the first portion of the second user interface element is positioned; and
- a second portion bounded by the first portion, the second portion being clear and through which the second user is able to see the second portion to see other elements of the user interface over which the second portion of the second user interface element is positioned, wherein the second portion decreases in size as time progresses during the communication session.

7. The system of claim 6, the executable operations further comprising:
updating, in real time, the first contextual indicator indicating the concentration level score of the first user based on further communication session data pertaining to the first user received during the electronic communication session; and
communicating the updated first contextual indicator to the second client device used by the second user, communicating the updated first contextual indicator to the second client device initiating the second client device to update the first user interface element indicating the concentration level score of the first user.

8. The system of claim 6, the executable operations further comprising:
generating a third contextual indicator indicating at least one circumstance contributing to the concentration level score of the first user; and
communicating the third contextual indicator to the second client device used by the second user, communicating the third contextual indicator to the second client device initiating the second client device to present, in the user interface used by the second user for the communication session, a third user interface element indicating the at least one circumstance.

9. The system of claim 6, the executable operations further comprising:
generating a third contextual indicator indicating at least one circumstance contributing to the determining the duration of time left for which the first user is available to continue participating in the communication session; and
communicating the third contextual indicator to the second client device used by the second user, communicating the third contextual indicator to the second client device initiating the second client device to present, in the user interface used by the second user for the communication session, a third user interface element indicating the at least one circumstance.

10. The system of claim 6, the executable operations further comprising:
updating, in real time, the second contextual indicator indicating the duration of time left for which the first user is available to continue participating in the communication session based on further communication session data pertaining to the first user received during the electronic communication session; and
communicating the updated second contextual indicator to the second client device used by the second user, communicating the updated second contextual indicator to the second client device initiating the second client device to update the second user interface element indicating the duration of time left for which the first user is available to continue participating in the communication session.

11. A computer program product, comprising:
a computer readable storage medium having program code stored thereon, the program code executable by a data processing system to initiate operations including:
receiving, from a first client device, communication session data pertaining to a first user during an electronic communication session in which the first user and at least a second user participate;
analyzing the communication session data and, based on the analyzing the communication session data, determining a concentration level score of the first user, the concentration level score indicating a level of concentration of the first user in the electronic communication session;
generating a first contextual indicator indicating the concentration level score of the first user;
communicating the first contextual indicator to a second client device used by the second user, communicating the first contextual indicator to the second client device initiating the second client device to present, in a user interface used by the second user for the communication session, a first user interface element indicating the concentration level score of the first user;
based on the analyzing the communication session data, determining a duration of time left for which the first user is available to continue participating in the communication session;
generating a second contextual indicator indicating the duration of time left for which the first user is available to continue participating in the communication session; and
communicating the second contextual indicator to the second client device used by the second user, communicating the second contextual indicator to the second client device initiating the second client device to present, in the user interface used by the second user for the communication session, a second user interface element indicating the duration of time left for which the first user is available to continue participating in the communication session, wherein the second user interface element indicating the duration of time left for which the first user is available to continue participating in the communication session comprises:
- a first portion that is shaded with a color but through which the second user is able to see other elements of the user interface over which the first portion of the second user interface element is positioned; and
- a second portion bounded by the first portion, the second portion being clear and through which the second user is able to see the second portion to see other elements of the user interface over which the second portion of the second user interface element is positioned, wherein the second portion decreases in size as time progresses during the communication session.

12. The computer program product of claim 11, wherein the program code is executable by the data processing system to initiate operations further comprising:
   updating, in real time, the first contextual indicator indicating the concentration level score of the first user based on further communication session data pertaining to the first user received during the electronic communication session; and
   communicating the updated first contextual indicator to the second client device used by the second user, communicating the updated first contextual indicator to the second client device initiating the second client device to update the first user interface element indicating the concentration level score of the first user.

13. The computer program product of claim 11, wherein the program code is executable by the data processing system to initiate operations further comprising:
   generating a third contextual indicator indicating at least one circumstance contributing to the concentration level score of the first user; and
   communicating the third contextual indicator to the second client device used by the second user, communicating the third contextual indicator to the second client device initiating the second client device to present, in the user interface used by the second user for the communication session, a third user interface element indicating the at least one circumstance.

14. The computer program product of claim 11, wherein the program code is executable by the data processing system to initiate operations further comprising:
   generating a third contextual indicator indicating at least one circumstance contributing to the determining the duration of time left for which the first user is available to continue participating in the communication session; and
   communicating the third contextual indicator to the second client device used by the second user, communicating the third contextual indicator to the second client device initiating the second client device to present, in the user interface used by the second user for the communication session, a third user interface element indicating the at least one circumstance.

15. The computer program product of claim 11, wherein the program code is executable by the data processing system to initiate operations further comprising:
   updating, in real time, the second contextual indicator indicating the duration of time left for which the first user is available to continue participating in the communication session based on further communication session data pertaining to the first user received during the electronic communication session; and
   communicating the updated second contextual indicator to the second client device used by the second user, communicating the updated second contextual indicator to the second client device initiating the second client device to update the second user interface element indicating the duration of time left for which the first user is available to continue participating in the communication session.

* * * * *